(12) United States Patent
Miyashita (10) Patent No.: US 8,584,023 B2
(45) Date of Patent: Nov. 12, 2013

(54) MOBILE TERMINAL DEVICE

(75) Inventor: Tsuneo Miyashita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 695 days.

(21) Appl. No.: 12/429,806

(22) Filed: Apr. 24, 2009

(65) Prior Publication Data

US 2010/0115423 A1    May 6, 2010

(30) Foreign Application Priority Data

Apr. 24, 2008 (JP) ................................ 2008-114588
Mar. 26, 2009 (JP) ................................ 2009-077195

(51) Int. Cl.
*G06F 15/00* (2006.01)
*G06F 13/00* (2006.01)

(52) U.S. Cl.
USPC .......................................... 715/752; 715/864

(58) Field of Classification Search
USPC .................. 345/418–475, 521; 709/204, 206; 715/751, 752, 803, 810, 764, 864, 716, 715/745
See application file for complete search history.

(56) References Cited

U.S. PATENT DOCUMENTS

| | | | |
|---|---|---|---|
| 7,013,429 B2 * | 3/2006 | Fujimoto et al. ............... | 715/752 |
| 7,478,168 B2 * | 1/2009 | Kamiya .......................... | 709/238 |
| 7,890,589 B2 * | 2/2011 | Munje et al. .................. | 709/206 |
| 2003/0084111 A1 | 5/2003 | Yasuta | |
| 2008/0168026 A1 * | 7/2008 | Patil et al. ..................... | 707/2 |
| 2009/0177673 A1 * | 7/2009 | Cunningham ................ | 707/100 |
| 2009/0182702 A1 * | 7/2009 | Miller ............................. | 706/60 |
| 2009/0182824 A1 * | 7/2009 | Haynes et al. ................ | 709/206 |
| 2009/0228807 A1 * | 9/2009 | Lemay .......................... | 715/752 |

FOREIGN PATENT DOCUMENTS

| | | |
|---|---|---|
| JP | 2000-003317 | 1/2000 |
| JP | 2003141035 A | 5/2003 |
| JP | 2007316941 A | 12/2007 |

OTHER PUBLICATIONS

Japanese language office action dated Feb. 1, 2013 and its English language translation issued in corresponding Japanese application 2009077195 cites the foreign patent document listed above.
Japanese language office action dated May 14, 2013 and its English language translation issued in corresponding Japanese application 2009077195 cites the foreign patent document listed above.

* cited by examiner

*Primary Examiner* — Cao "Kevin" Nguyen
(74) *Attorney, Agent, or Firm* — DLA Piper LLP (US)

(57) ABSTRACT

Provided is a mobile terminal device that can improve operability for editing a mail with a simple configuration. A cellular telephone device 1 is provided with a control unit 38, which controls so that, when a received mail message is displayed on a display part 21, an unsent mail message associated with the received mail message is read out in response to a predetermined operation by way of an operation unit 11, and the unsent mail message is displayed on the display part 21; and when an unsent mail message is displayed on the display part 21, a received mail message associated with the unsent mail message is read out in response to a predetermined operation by the operation unit 11, and the received mail message is displayed on the display part 21.

7 Claims, 4 Drawing Sheets

MOBILE TERMINAL DEVICE

This application is based on and claims the benefit of priority from Japanese Patent Application Nos. 2008-114588 and 2009-077195, respectively filed on 24 Apr. 2008 and 26 Mar. 2009, the content of which is incorporated herein by reference.

BACKGROUND OF THE INVENTION

1. Field of the Invention

The present invention relates to a mobile terminal device that has a function for transmitting and receiving mail.

2. Related Art

A mobile terminal device generally has a function for transmitting and receiving mail messages to and from other terminal devices. In such a mobile terminal device, the creation and editing of a mail message is performed by creating a new mail message and editing thereof or by creating a reply mail message to a mail message that has been received in the past and editing thereof.

Here, in a case in which the user can not immediately reply to the mail received in the past (hereinafter referred to as the received mail message), the received mail message to which the user is planning to reply may be buried in other received mail messages, thereby making it difficult to find the relevant received mail message. In order to solve such a problem, a technique has been proposed, in which a specific mark serving as a guide for later retrieving is added to the received mail to which the user is planning to reply (for example, refer to Japanese Unexamined Patent Application, First Publication No. 2000-3317).

SUMMARY OF THE INVENTION

However, although it is possible for a user to find the received mail to which a reply is being attempted by such a technique, in a case in which the user desires to refer to the contents of that relevant received mail message while creating a reply mail message, it is required that the reply mail message is temporarily saved as an unsent message mail, a folder storing the received mail message is accessed, the relevant received mail message is searched for and referred to from among a folder thereof, and subsequently again, it is necessary to create the once saved reply mail message. In this way, the prior art has been inferior in operability for editing a mail message, thereby leading to a deterioration in services for the user.

The present invention has been made in view of the aforementioned problems, and one object thereof is to provide a mobile terminal device that can improve operability for editing a mail message with a simple configuration.

According to a first aspect of the present invention, in order to solve the above-mentioned problems, a mobile terminal device, comprising: a creating-and-editing part that creates and edits the mail message; a display part that displays the mail message that has been created and edited by way of the creating-and-editing part; a storage unit that stores the mail message that has been created and edited by way of the creating-and-editing part; a transmitting part that transmits the mail message, which has been created and edited by the creating-and-editing part, to the external device; a receiving part that receives a mail message from the external device; an operating unit that accepts input of a predetermined operation; and a control unit which: in a case in which a mail message associated with a received mail message that was received by the receiving part has not yet been transmitted by the transmitting part, stores the associated mail message as an unsent mail message so as to be associated with the received mail message in the storage unit, in a case in which the received mail message is displayed on the display part, the unsent mail message associated with the received mail message is read and displayed on the display part in response to a predetermined operation by way of the operating unit, and in a case in which the unsent mail message is displayed on the display part, the received mail message associated with the unsent mail message is read out in response to a predetermined operation by the operating unit, and the received mail message is displayed on the display part.

In a second aspect of the present invention, a mobile terminal device according to the first aspect preferably includes a deleting part that deletes a mail message, in which the control unit controls such that the unsent mail message displayed on the display part is edited by the creating-and-editing part or deleted by the deleting part.

According to a third aspect of the present invention, in a mobile terminal device according to the first aspect, the control unit preferably controls such that: in a case in which the received mail message is displayed on the display part, the unsent mail message associated with the received mail message is read out in response to a single operation by way of the operating unit, and the unsent mail message is displayed on the display part; and in a case in which the unsent mail message is displayed on the display part, the received mail message associated with the unsent mail message is read in response to a single operation by way of the operating unit, and the received mail message is displayed on the display part.

In a fourth aspect of the present invention, a mobile terminal device according to the second aspect, in which the control unit preferably controls such that, in a case in which the unsent mail message is transmitted by the transmitting part, or in a case in which the unsent mail message is deleted by the deleting part, the received mail message associated with the unsent mail message is displayed on the display part.

According to a fifth aspect of the present invention, in a mobile terminal device according to the first aspect, the control unit preferably controls such that, in a case in which there is a plurality of the unsent mail messages associated with the received mail message, the unsent mail messages are preferentially read out in order of creation date and time or editing date and time of the unsent mail message, and the unsent mail message is displayed on the display part.

According to a sixth aspect of the present invention, in a mobile terminal device according to the second aspect, the control unit preferably controls such that, in a case in which there is a plurality of the unsent mail messages associated with the received mail message, and one of the unsent mail messages that is displayed on the display part is transmitted by the transmitting part or deleted by the deleting part, another unsent mail message among the unsent mail messages is displayed on the display part.

According to a seventh aspect of the present invention, in a mobile terminal device according to the sixth aspect, the control unit preferably controls such that the other unsent mail message displayed on the display part is edited by the creating-and-editing part or deleted by the deleting part.

In an eighth aspect of the present invention, a mobile terminal device, comprising: a creating-and-editing part that creates and edits the mail message; a display part that displays the mail message that has been created and edited by way of the creating-and-editing part; a storage unit that stores the mail message that has been created and edited by way of the creating-and-editing part; a transmitting part that transmits the mail message, which has been created and edited by the creating-and-editing part, to the external device; a receiving part that receives a mail message from the external device; an operating unit that accepts input of a predetermined operation; and a control unit which: in a case in which a plurality of mail messages associated with a received mail message that was received by the receiving part has not yet been transmitted by the transmitting part, stores the plurality of associated mail messages as an unsent mail group so as to be associated with the received mail message in the storage unit, and in a case in which one unsent mail message in the unsent mail group is displayed on the display part, and a predetermined operation is performed by way of the operating unit, another unsent mail message in the unsent mail group is read out, and the other unsent mail message is displayed on the display part.

According to a ninth aspect of the present invention, a mobile terminal device according to the eighth aspect preferably further includes a deleting part that deletes a mail message, in which the control unit controls such that the other unsent mail message displayed on the display part is edited by the creating-and-editing part or deleted by the deleting part.

According to a tenth aspect of the present invention, in a mobile terminal device according to the eighth aspect, the control unit preferably controls such that, in a case in which the one unsent mail message is displayed on the display part, the other unsent mail message is read out in response to a single operation by way of the operating unit, and the other unsent mail message is displayed on the display part.

According to an eleventh aspect of the present invention, in a mobile terminal device according to the ninth aspect, the control unit preferably controls such that, in a case in which the one unsent mail message is displayed on the display part, the other unsent mail message is read out in response to a single operation by way of the operating unit, and the other unsent mail message is displayed on the display part; and in a case in which the other unsent mail message is transmitted by the transmitting part or the other unsent mail message is deleted by the deleting part, the one unsent mail message is displayed on the display part.

According to an twelfth aspect of the present invention, in a mobile terminal device according to the eighth aspect, the control unit preferably controls such that, in a case in which there is a plurality of the other unsent mail messages, the unsent mail messages are preferentially read out in order of creation date and time or editing date and time of the unsent mail message from new, and the unsent mail message is displayed on the display part.

According to an thirteenth aspect of the present invention, in a mobile terminal device according to the ninth aspect, the control unit preferably controls such that, in a case where there is a plurality of the other unsent mail messages, one of the unsent mail messages among thereof is displayed on the display part, and the one unsent mail message displayed on the display part is transmitted by the transmitting part or deleted by the deleting part, another unsent mail message, which is not displayed on the display part, is then displayed on the display part.

According to a fourteenth aspect of the present invention, a mobile terminal device according to the thirteenth aspect preferably further includes a deleting part for deleting a mail message, in which the control unit preferably controls such that the other unsent mail message displayed on the display part is edited by the creating-and-editing part or deleted by the deleting part.

According to a fifteenth aspect of the present invention, in order to solve the above-mentioned problems, a mobile terminal device, comprising: a creating-and-editing part that creates and edits the mail message; a display part that displays the mail message that has been created and edited by way of the creating-and-editing part; a storage unit that stores the mail message that has been created and edited by way of the creating-and-editing part; a transmitting part that transmits the mail message, which has been created and edited by the creating-and-editing part, to the external device; a receiving part that receives a mail message from the external device; an operating unit that accepts input of a predetermined operation; and a control unit which: in a case in which a mail message associated with a received mail message that was received by the receiving part has not yet been transmitted by the transmitting part, stores the associated mail message as an unsent mail message so as to be associated with the received mail message in the storage unit, and in a case in which the unsent mail message is displayed on the display part, the received mail message associated with the unsent mail message is read out in response to a predetermined operation by the operating unit, and the received mail message is displayed on the display part.

In a sixteenth aspect of the present invention, in order to solve the above-mentioned problems, a mobile terminal device includes: a receiving part that receives a mail message; a storage unit that stores a mail message; a creating-and-editing part that performs creation and editing of a mail message; and a control unit that associates a mail message related to a mail message received by the receiving part, which is the mail message for which creation and editing has been performed by the creating-and-editing part, with the received mail message and storing thereof in the storage unit.

According to the present invention, it is possible to provide a mobile terminal device that can improve operability for editing a mail message.

DETAILED DESCRIPTION OF THE INVENTION

Figure 1:
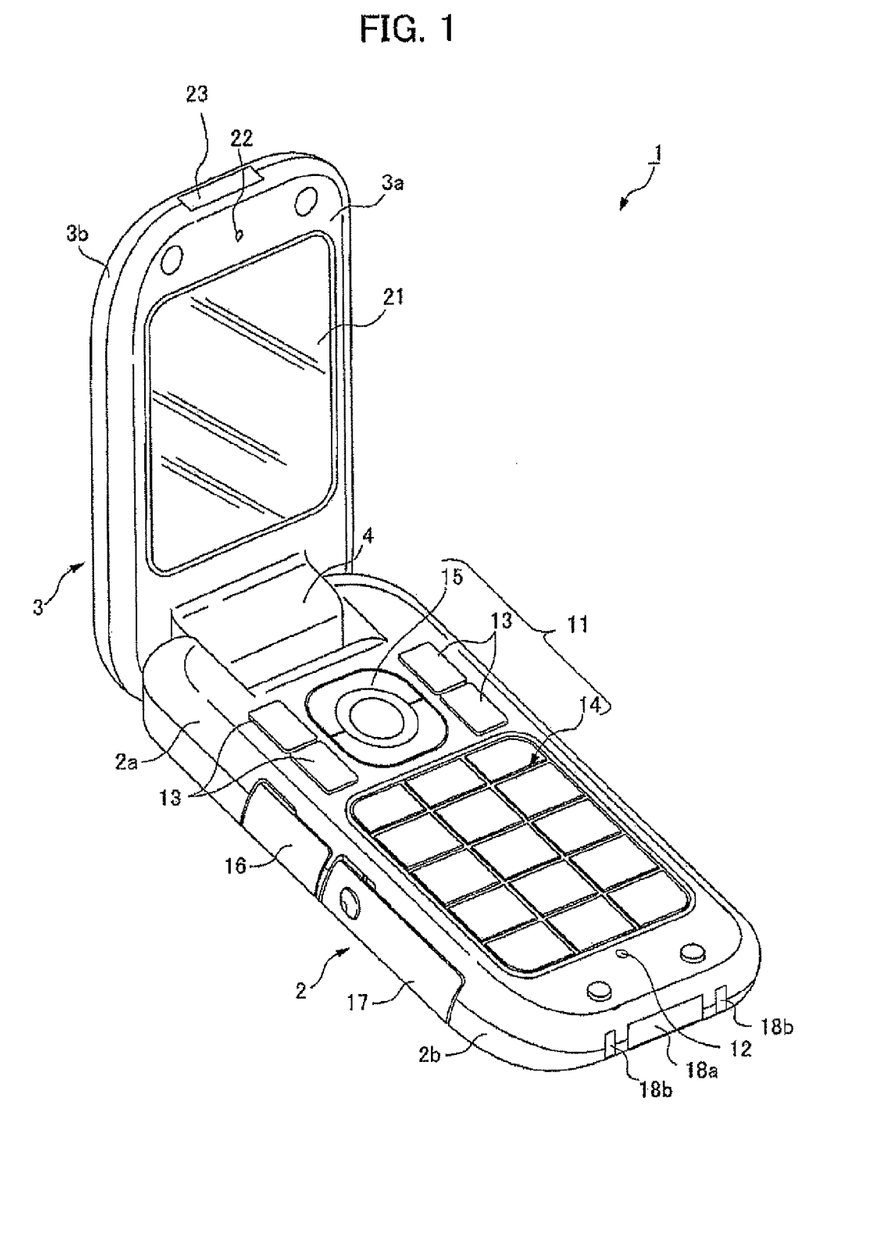
FIG. 1 is a perspective view showing an appearance of a cellular telephone device according to the present invention.

An example of embodiments according to the present invention is described as follows. FIG. 1 is an outside perspective view of a cellular telephone device 1 that is an example of a mobile terminal device of the present invention for performing communication with an external device (base station).

As exemplarily shown in FIG. 1, the cellular telephone device 1 includes: an operation unit side body 2 having an outer face thereof formed by a front case 2a and a rear case 2b; a display unit side body 3 having an outer face thereof formed with a front case 3a and a rear case 3b; and a hinge mechanism 4 that connects the operation unit side body 2 and the display unit side body 3.

The operation unit side body 2 includes an operation unit 11 and a sound input unit 12, which are disposed so as to be exposed to a surface side of the front case 2a. The operation unit 11 is configured with: feature setting operation keys 13 for operating various features such as for various settings, a telephone number directory feature and a mail feature; input operation keys 14 for inputting digits of a telephone number and characters for mail; and a selection operation key 15 that performs selection of the various operations, scrolling and the like. Moreover, an earphone connector cap 16, and a cap 17 that covers an interface (not shown) for performing communication with the external device (base station) are provided to a side face of the operation unit side body 2. Furthermore, a cap 18a that covers a charging connector (not shown) and a pair of charging contact portions 18b are provided to a lower end portion of the operation unit side body 2. It should be noted that the sound input unit 12 is used for inputting sound of the user of the cellular telephone device 1 when conversing.

The display unit side body 3 is configured by including a display part 21 for displaying a variety of information and a sound output unit 22 for outputting sound of the other party of the conversation. Moreover, a communications unit 23 that performs infrared communication with another cellular telephone device is provided to an upper end portion of the display unit side body 3.

The hinge mechanism 4 connects the operation unit side body 2 and the display unit side body 3 so as to enable relative movement thereof. The hinge mechanism 4 achieves a configuration that enables changing states between a used state (opened state) in which the operation unit side body 2 and the display unit side body 3 are mutually opened, and a stored state (folded state) in which a surface of the operation unit side body 2 and a surface of the display unit side body 3 face each other.

It should be noted that, in the present embodiment, although the cellular telephone device 1 of a so-called flip type is exemplified as an example of a mobile terminal in which the operation unit side body 2 and the display unit side body 3 can move relatively via the hinge mechanism 4, instead of the flip type, the present invention can also be applied to: a slider type in which one of the bodies slides to one direction in a state in which the operation unit side body 2 and the display unit side body 3 are mutually superimposed; a rotating type in which one of the bodies rotates around an axis line along the direction of superimposing the bodies; a type in which the operation unit side body 2 and the display unit side body 3 are connected via a biaxial hinge; and a type (a so-called straight type) in which the operation unit side body 2 and the display unit side body 3 are disposed in one body.

Figure 2:
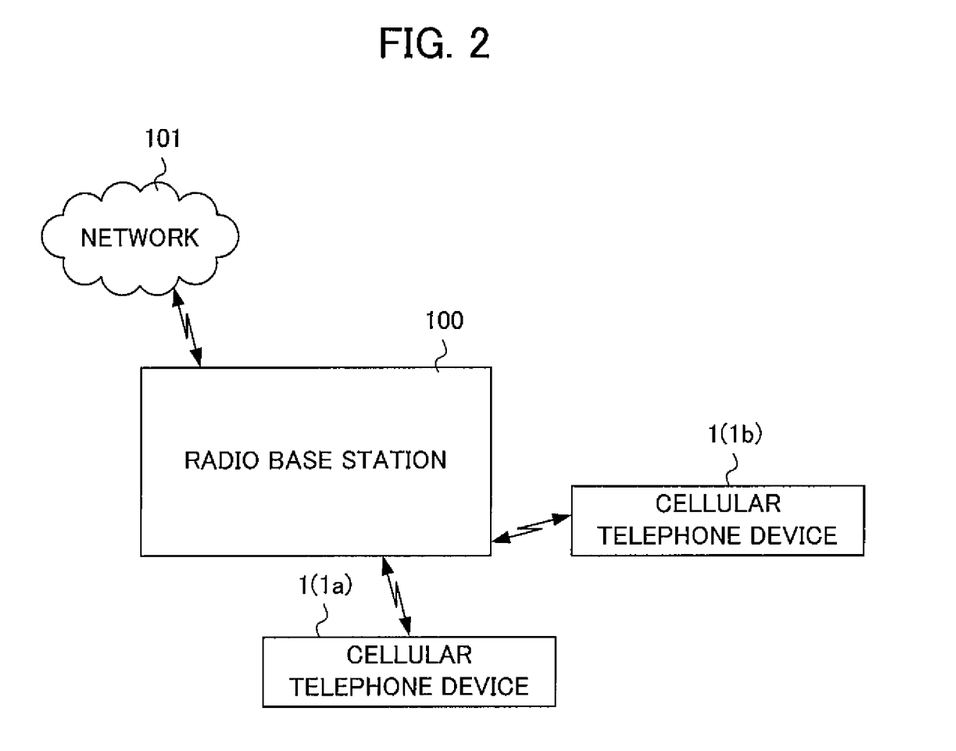
FIG. 2 is a schematic diagram showing a manner in which the cellular telephone devices according to the present invention are connected to a network via a radio base station.

Moreover, as exemplarily shown in FIG. 2, a radio connection is established between the cellular telephone devices 1 (1a and 1b) so as to communicate with a network 101 via a radio base station 100.

It should be noted that, in describing the following embodiments, the same reference numerals are assigned to the same constituents, and descriptions thereof are omitted or simplified.

First Embodiment

Figure 3:
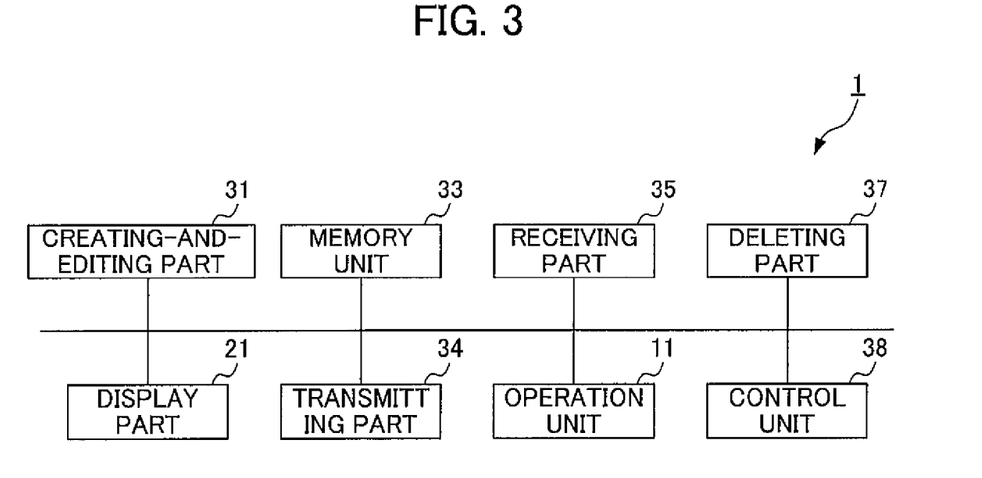
FIG. 3 is a functional block diagram showing features of the cellular telephone device according to the present invention.

An example of a first embodiment of the cellular telephone device 1 according to the present invention is hereinafter described. FIG. 3 is a block diagram showing the features of the cellular telephone device 1 according to the present invention. The cellular telephone device 1 is provided with: a creating-and-editing part 31 that creates and edits E-mails (hereinafter referred to as a mail message); a display part 21 that displays the mail message created and edited by the creating-and-editing part 31; a memory unit 33 that stores the mail message created and edited by the creating-and-editing part 31; a transmitting part 34 that transmits the mail message, which has been created and edited by the creating-and-editing part 31, to external devices via the network 101; a receiving part 35 that receives a mail message from the outside; an operation unit 11 that performs predetermined key operations; a deleting part 37 that deletes a mail message; and a control unit 38 that performs predetermined controls for the creating-and-editing part 31, the display part 21, the memory unit 33, the transmitting part 34, the receiving part 35, the operation unit 11 and the deleting part 37.

"Creating a mail message" in the creating-and-editing part 31 refers to performing a new creation of, for example, a new mail message, a reply mail message, a forwarded mail message, and the like. Moreover, "editing a mail message" in the creating-and-editing part 31 refers, for example, to performing addition, deletion, modification, or the like to a new mail message already created by the creating-and-editing part 31, a received mail message, a reply mail message, an unsent mail message, a forwarded mail message, or the like.

Moreover, in a case in which a mail message associated with a received mail message that has been received by the receiving part 35 is not yet transmitted by the transmitting part 34, the control unit 38 controls such that the memory unit 33 stores the associated mail as an unsent mail message so as to be associated with the received mail message.

Here, the "associated mail" typically is a reply mail message in response to a received mail message or a forwarded mail message, and otherwise may be a single or a plurality of mail messages having a part of the mail addresses that is the destination, a part of the subject of the mail message, or a part of the mail message text that has a portion which overlaps that of a particular received mail message, unsent mail message, forwarded mail message, or the like. Moreover, a mail is also included which is individually associated by the user as an associated mail.

To "store the associated mail so as to be associated with the received mail message" indicates, for example, in a case of an associated mail message with a reply mail message or a forwarded mail message, mutually linking the reply mail message or the forwarded mail message with the original mail message and storing thereof in the unit 33. That is to say, while browsing a reply mail message or a forwarded mail message, a user can browse the original mail message with a simplified operation, and moreover, while browsing the original mail message, a user can browse the reply mail message or the forwarded mail message with a simplified operation.

Alternatively, this refers to extracting a mail message corresponding to the associated mail message using a sorting function of mail, mutually linking the extracted mail messages together, and storing thereof in the memory unit 33.

Moreover, when the received mail message is displayed on the display part 21, the control unit 38 controls such that the unsent mail associated with the received mail is read and displayed on the display part 21 in response to a predetermined operation by the operation unit 11. Alternatively, when the unsent mail is displayed on the display part 21, the control unit 38 controls such that the received mail associated with the unsent mail is read and displayed on the display part 21 in response to a predetermined operation by the operation unit 11.

To "read out an unsent mail message associated to a received mail message" refers, for example, to applying a sorting function of mail, extracting mail messages that correspond to mail messages associated with a received mail message based on the above-described mutual links, and reading out mail messages thus extracted. In addition, to "read out a received mail message associated with an unsent mail message" refers, for example, to applying a sorting function of mail, extracting mail messages that correspond to mail messages associated with an unsent mail message based on the above-described mutual links, and reading out mail messages thus extracted.

With such a configuration, when a received mail or an unsent mail message is displayed on the display part 21, the cellular telephone device 1 can display an unsent mail associated with the received mail or a received mail message associated with the unsent mail on the display part 21. Accordingly, the user can easily refer to an unsent mail message associated with the received mail, or a received mail message associated with the unsent mail.

Moreover, the control unit 38 may be configured to control such that an unsent mail message displayed on the display part 21 is edited by the creating-and-editing part 31 or deleted by the deleting part 37.

With such a configuration, the cellular telephone device 1 controls such that an unsent mail message displayed on the display part 21 is edited or deleted. Therefore, the user can edit or delete an unsent mail message while referring to a received mail associated with the unsent mail.

Moreover, the control unit 38 controls such that, when a received mail is displayed on the display part 21, an unsent mail message associated with the received mail is read and displayed on the display part 21 in response to a single operation (for example, a depressing operation on a direction key constituting the selection operation key 15) by way of the operation unit 11. Alternatively, the control unit 38 may be configured to control such that, when the unsent mail is displayed on the display part 21, received mail associated with the unsent mail is read and displayed on the display part 21 in response to a single operation by the operation unit 11.

With such a configuration, in response to a single operation by the operation unit 11, the cellular telephone device 1 can read out a mail message associated with the received mail, or received mail associated with the unsent mail from the memory unit 33 and display thereof on the display part 21. Therefore, the user can switch the display from a received mail to a mail message associated with the received mail message, or from an unsent mail message to a mail message associated with the unsent mail, by an easy operation.

Moreover, the control unit 38 may be configured to control such that, when an unsent mail message is transmitted by the transmitting part 34, or when the unsent mail message is deleted by the deleting part 37, a received mail message associated with the unsent mail message is displayed on the display part 21.

With such a configuration, when an unsent mail message is transmitted, or when the unsent mail message is deleted, the cellular telephone device 1 displays received mail associated with the unsent mail on the display part 21. Therefore, when an unsent mail is transmitted or deleted, the user can easily refer to a received mail associated with the unsent mail.

Moreover, the control unit 38 may be configured to control such that, in a case in which there are a plurality of unsent mail messages associated with a received mail, the unsent mail messages are preferentially read out in order of creation date and time or editing date and time of the unsent mail from new, the unsent mail messages are displayed on the display part 21.

To "preferentially read out" indicates, for example, to read out unsent mail messages in order of new creation data and time or editing data and time, according to an operation at the operation unit 11.

With such a configuration, in a case in which there are a plurality of unsent mail messages associated with a received mail, in the cellular telephone device 1 preferentially reads out the unsent mail messages in order of creation date and time or editing date and time thereof from new and displays the unsent mail message thus read out on the display part 21. Therefore, it is possible to display unsent mail messages in order of the creation date and time or editing date and time thereof from new, which priority is considered to be high for the user, on the display part 21.

Here, an example of operations of the control unit 38 is described, for a case in which there is a plurality of unsent mail messages associated with a received mail message, and the unsent mail messages are preferentially read. When the unsent mail messages are read, which have been stored in the memory unit 33 so as to be associated with a received mail message, the control unit 38 sorts the unsent mail messages thus read. Criteria for sorting are the latest date and time of creating the unsent mail messages, the latest date and time of editing the unsent mail messages, titles of the unsent mail messages, mail addresses of the unsent mail messages, and the like. The control unit 38 reads the unsent mail messages in the sorted order, and displays thereof on the display part 21.

Moreover, the control unit 38 may be configured to control such that, in a case in which there are a plurality of unsent mail messages associated with a received mail message, and one of the unsent mail messages displayed on the display part 21 is transmitted by the transmitting part 34 or deleted by the deleting part 37, the other unsent mail messages among the unsent mail messages are displayed on the display part 21.

With such a configuration, in a case in which one of the plurality of unsent mail messages is transmitted or deleted, the cellular telephone device 1 can display the other unsent mail messages among the unsent mail messages on the display part 21. Therefore, after completion of editing or deleting one of the unsent mail messages, the other unsent mail messages can be easily referred to.

Moreover, the control unit 38 may be configured to control such that the other unsent mail messages, which are displayed on the display part 21, are edited by the creating-and-editing part 31 or deleted by the deleting part 37.

With such a configuration, the cellular telephone device 1 can control such that the other unsent mail messages, which are displayed on the display part 21, are edited or deleted. Accordingly, the user can easily edit or delete the other unsent mail messages after completion of editing or deleting one of the plurality of unsent mail messages.

Here, there are cases in which predetermined data is attached as an attached file to forwarded mail messages or received mail messages associated with unsent mail messages. In this case, when an unsent mail message is displayed on the display part 21, the control unit 38 displays the predetermined data attached to the received mail message or the forwarded mail message on the display part 21 according to a simplified attached data display operation different from a predetermined operation by way of the operation unit 11.

More specifically, the control unit 38 displays image data attached to a received mail message according to an attached data display operation on the display part 21 in a case in which image data has been attached as predetermined data to a received mail message associated with the unsent mail message. It should be noted that, in the operation unit 11, a key that performs the attached data display operation is made to be an assigned key that is different from a key performing the predetermined operation.

"Predetermined data" indicates data attached to this mail message in a forwarded mail message or a received mail message associated with the unsent mail message. Predetermined data can be exemplified by image data, video data, text data, audio data, and the like. The number of sets of predetermined data is not particularly limited, but one or a plurality of sets of data are attached to a forwarded mail message or a received mail message associated with an unsent mail message.

With such a configuration, in a case in which an unsent mail message is displayed on the display part 21, the predetermined data attached to the received mail message or forwarded mail message can be referred to by an easy operation. Therefore, according to the cellular telephone device 1 of the present embodiment, it is possible to improve operability for a forwarded mail message or a received mail message associated with an unsent mail message.

Second Embodiment

Next, an example of a second embodiment of the cellular telephone device 1 according to the present invention is described. The cellular telephone device 1 according to the second embodiment is hereinafter described mainly with points that differ from the cellular telephone device 1 according to the first embodiment, and the other descriptions are omitted.

In the second embodiment, in a case in which a plurality of mail messages associated with a received mail message, which was received by the receiving part 35, have not yet transmitted by the transmitting part 34, the memory unit 33 stores the plurality of associated mail messages as an unsent mail group so as to be associated with the received mail message.

"Stores as an unsent mail group" indicates that, for example, a plurality of associated mail messages are associated with a received mail message, and stored in one folder.

Moreover, when one unsent mail message in the unsent mail group is displayed on the display part 21, and a predetermined operation is performed by the operation unit 11, the control unit 38 controls such that the other unsent mail messages in the unsent mail group are read and displayed on the display part 21.

With such a configuration, in, when one unsent mail message in the unsent mail group is displayed on the display part 21, and a predetermined operation is performed by the operation unit 11, the cellular telephone device 1 reads the other unsent mail messages in the unsent mail group, and displays thereof on the display part 21. Therefore, the user can easily refer to the other unsent mail messages associated with the one unsent mail message.

Moreover, the control unit 38 may be configured to control such that the other unsent mail messages, which are displayed on the display part 21, are edited by the creating-and-editing part 31 or deleted by the deleting part 37.

With such a configuration, the cellular telephone device 1 can edit or delete the other unsent mail messages in the unsent mail group that are displayed on the display part 21. Therefore, the user can edit or delete the other unsent mail messages while referring to one unsent mail message.

Moreover, the control unit 38 may be configured to control such that, when one unsent mail message is displayed on the display part 21, the other unsent mail messages are read and displayed on the display part 21 in response to a single operation (for example, a depression operation of the direction key constituting the selection operation key 15) by the operation unit 11.

With such a configuration, when one unsent mail message is displayed on the display part 21, the cellular telephone device 1 reads out the other unsent mail messages in response to a single operation by the operation unit 11, and displays thereof on the display part 21. Therefore, the user can switch displaying from one unsent mail message to the other unsent mail messages by performing an easy operation.

Moreover, the control unit 38 may be configured to control such that, when one unsent mail message is displayed on the display part 21, the other unsent mail messages are read and displayed on the display part 21 in response to a single operation by the operation unit 11, and when the other unsent mail messages are transmitted by the transmitting part 34 or the other unsent mail messages are deleted by the deleting part 37, the one unsent mail message is displayed on the display part 21.

With such a configuration, when one unsent mail message is displayed on the display part 21, the cellular telephone device 1 reads out the other unsent mail messages in response to a single operation by way of the operation unit 11, and displays thereof on the display part 21. Moreover, when the other unsent mail messages are transmitted or deleted, the one unsent mail message, which had been displayed on the display part 21 before performing the single operation by way of the operation unit 11, is displayed on the display part 21. Therefore, the user can easily refer to the one unsent mail message associated with the other unsent mail messages after transmitting or deleting the other unsent mail messages.

Moreover, the control unit 38 may be configured to control such that, in a case in which there is a plurality of the other unsent mail messages, the unsent mail messages are preferentially read out in order of creation date and time or editing date and time of the unsent mail messages from new, and the unsent messages are displayed on the display part 21.

With such a configuration, in a case in which there are a plurality of other unsent mail messages associated with one unsent mail message, the cellular telephone device 1 preferentially reads out the unsent mail messages in order of creation date and time or editing date and time of the unsent mail messages from new, and displays thereof on the display part 21. Therefore, it is possible to display the other unsent mail messages in order of creation date and time or editing date and time thereof from new, for which the priority for the user is considered to be high, on the display part 21.

Moreover, the control unit 38 may be configured to control such that, in a case in which there are a plurality of other unsent mail messages, and one of the unsent mail messages among thereof is displayed on the display part 21, and in a case in which the one unsent mail message that is displayed on the display part 21 is transmitted by the transmitting part 34 or deleted by the deleting part 37, the other unsent mail messages, which are not displayed on the display part 21, are then displayed on the display part 21.

With such a configuration, in the cellular telephone device 1, in a case in which there is a plurality of other unsent mail messages associated with one unsent mail message, one of the unsent mail messages among thereof is displayed on the display part 21, and the one unsent mail message displayed is transmitted or deleted, the other unsent mail messages, which are not displayed, are then displayed on the display part 21. Therefore, the user can easily refer to the other unsent mail messages after transmitting or deleting one unsent mail message.

Moreover, the control unit 38 may be configured to control such that the other unsent mail messages, which are displayed on the display part 21, are edited by the creating-and-editing part 31 or deleted by the deleting part 37.

With such a configuration, the cellular telephone device 1 controls such that the other unsent mail messages, which are associated with one unsent mail message displayed on the display part 21, are edited or deleted. Therefore, after completion of editing or deleting one unsent mail message among the plurality of other unsent mail messages, the user can easily edit or delete the other unsent mail messages.

Here, an example of changing an appearance of a mail message display screen that is displayed on the display part 21 of the cellular telephone device 1 according to the first and second embodiments is described with reference to FIG. 4.

Figure 4:
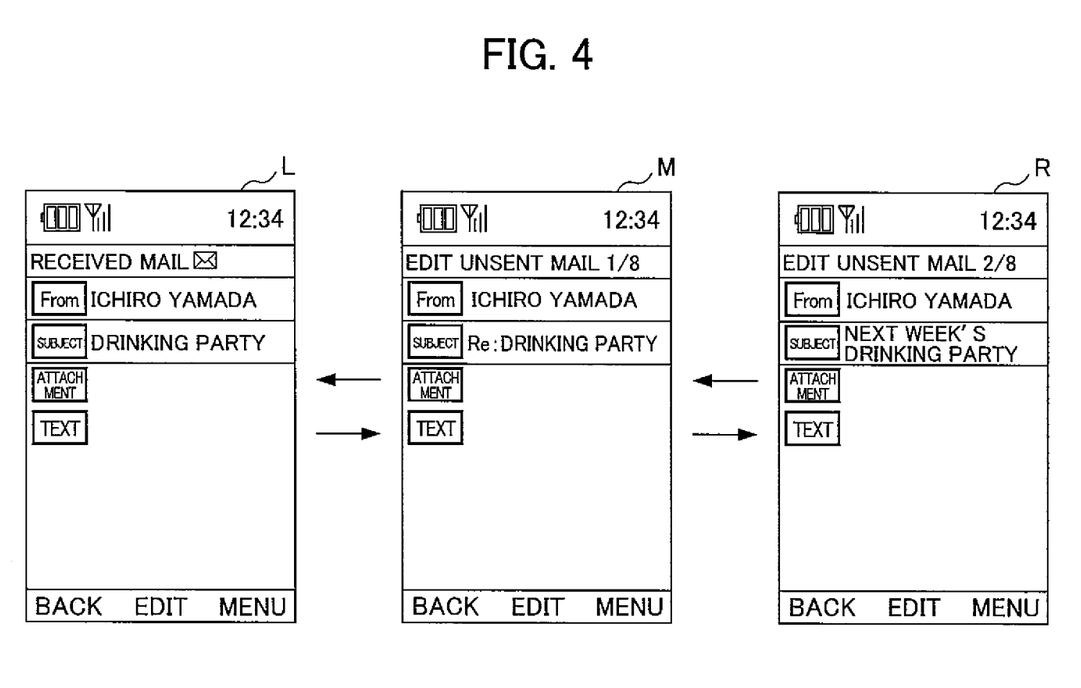
FIG. 4 is a view showing an example of mail display screens that are displayed on the display unit.

As shown in FIG. 4, a display screen L is a browsing screen of a received mail message, a display screen M is an editing screen of an unsent mail associated with the received mail message that is displayed on the display screen L, and a display screen R is an editing screen of another unsent mail message associated with the unsent mail message that is displayed on the display screen M.

When browsing a received mail message on the display screen L, the user depresses, for example, a right direction key (hereinafter referred to as the right direction key) constituting the selection operation key 15, as an example of the single operation. As a result, the display screen is switched to the display screen M, thereby making it possible to browse, edit or delete unsent mail messages associated with the received mail message. Here, when "edit" in a center of a lower end portion of the screen is selected, a submenu for editing is displayed, and by selecting "transmit," "edit," "delete" or the like from the submenu, the received mail messages or the unsent mail messages can be transmitted, edited, deleted or the like.

Moreover, while browsing or editing an unsent mail message on the display screen M, a left direction key (hereinafter referred to as the left direction key), for example, which constitutes the selection operation key 15, is depressed, as an example of the single operation. As a result, the display screen is switched to the display screen L, thereby making it possible to browse, edit or delete the received mail message associated with the unsent mail message. Then, by depressing the right direction key, the display screen is switched to the display screen R, thereby making it possible to browse, edit or delete the other unsent mail messages associated with the unsent mail message. It should be noted that, when editing of a received mail message is selected, an unsent mail message is created as a new associated mail message.

Moreover, while browsing or editing an unsent mail message on the display screen R, by depressing the left direction key, the display screen is switched to the display screen M, thereby making it possible to browse, edit or delete unsent mail messages associated with the other unsent mail messages. Therefore, by depressing the right direction key while browsing a received mail message, it is possible to display the latest unsent mail message among the associated mail messages associated with the received mail message. By depressing the right direction key again while displaying this unsent mail message, it is possible to display a new unsent mail message having an editing date and time that is the second latest to the latest unsent mail message among the associated mail messages. Alternatively, by depressing the left direction key while displaying this unsent mail message, it is possible to display the received mail again.

Moreover, by depressing the left direction key after displaying the unsent mail having an editing date and time that is the second latest to the latest unsent mail message, it is possible to display the latest unsent mail message again. Thereafter, by depressing the left direction key again while displaying this latest unsent mail message, it is possible to display the received mail message as described above.

In this way, in the relationship of display ranking among the received mail messages and the unsent mail message, it is possible to switch the display from the received mail message to the unsent mail message, which should have top priority, and vice versa, i.e. it is also possible to switch the display from the unsent mail which should have top priority to the received mail. Furthermore, unsent mail messages having adjacent priority rankings of display also can be switched between.

It should be noted that, although the control unit 38 controls such that the received mail messages associated with the unsent mail messages as well as the other unsent mail messages are stored in the memory unit 33 by performing association in the aforementioned embodiments, it is not limited thereto. For example, the control unit 38 controls such that the other received mail messages associated with the received mail messages are stored in the memory unit 33 by performing association. Moreover, when the received mail message is displayed on the display part 21, the control unit 38 controls such that the other received mail messages associated with the received mail message are read and displayed on the display part 21 in response to a predetermined operation by the operation unit 11. Alternatively, the control unit 38 may be configured to control such that, when the other received mail messages are displayed on the display part 21, a received mail message associated with the other received mail messages is read out in response to a predetermined operation by the operation unit 11, and the received mail message is displayed on the display part 21.

With such a configuration, when a received mail message is displayed on the display part 21, the cellular telephone device 1 can display the other received mail messages associated with the received mail message on the display unit 21. Therefore, the user can easily refer to the other received mail messages associated with the received mail message.

Although embodiments of the present invention have been described above, the present invention is not limited to the aforementioned embodiments. Moreover, the effects described in the embodiments of the present invention merely illustrate the most preferred effects arising from the present invention, and the effects according to the present invention are not limited to those described in the embodiments of the present invention.

It should be noted that, in the embodiments described above, although an example is described in which unsent mail messages and received mail messages are switched therebetween in regards to one example of a mail display screen that is displayed on the display part 21, the present invention is not limited thereto. For example, in a case where an unsent mail message is displayed on the display part 21, the control unit 38 may be configured so that a received mail message related to an unsent mail message is displayed as a pop-up on the display part 21. Similarly, in a case where a received mail message is displayed on the display part 21, the control unit 38 may be configured so that an unsent mail message related to a received mail message is displayed as a pop-up on the display part 21.

In this case, a position at which the pop-up is displayed on the display part 21 may a location where the pop-up is superimposed on an unsent mail message or a received mail message on the display part 21. Alternatively, a position at which the pop-up is displayed on the display part 21 may be within an area in which an unsent mail message or a received mail message is not displayed on the display part 21.

In addition, the control unit 38 causes a scroll bar to be displayed at a predetermined position of the pop-up display. Then, in a case where the pop-up is displayed on the display part 21, the control unit 38 may display information displayed in the pop-up to be scrolled by way of operating the scroll bar.

What is claimed is:

1. A mobile terminal device, comprising:
a display part that displays a received mail message, and an unsent mail message that is associated with the received mail message, and a predetermined data attached as an attached file to the received mail message;

an operating unit in which a predetermined operation is performed; and a control unit that controls such that the predetermined data is displayed on the display part in response to the predetermined operation while the unsent mail message is displayed on the display part.

2. The mobile terminal device according to claim 1, comprising a deleting part that deletes a mail message, wherein the control unit controls such that the unsent mail message displayed on the display part is edited by a creating-and-editing part or deleted by the deleting part.

3. The mobile terminal device according to claim 2, wherein the control units controls such that, in a case in which the unsent mail message is transmitted by a transmitting part, or in a case in which the unsent mail message is deleted by the deleting part, the received mail message associated with the unsent mail message is displayed on the display part.

4. The mobile terminal device according to claim 2, wherein the control unit controls such that, in a case in which there is a plurality of the unsent mail messages associated with the received mail message, and one of the unsent mail messages that are displayed on the display part is transmitted by a transmitting part or deleted by the deleting part, another unsent mail message among the unsent mail messages is displayed on the display part.

5. The mobile terminal device according to claim 4, wherein the control unit controls such that the other unsent mail message displayed on the display part is edited by a creating-and-editing part or deleted by the deleting part.

6. The mobile terminal device according to claim 1, wherein the control unit controls such that:

in a case in which the received mail message is displayed on the display part, the unsent mail message associated with the received mail message is read out in response to a single operation by way of the operating unit, and the unsent mail message is displayed on the display part; and in a case in which the unsent mail message is displayed on the display part, the received mail message associated with the unsent mail message is read in response to a single operation by way of the operating unit, and the received mail message is displayed on the display part.

7. The mobile terminal device according to claim 1, wherein the control unit controls such that, in a case in which there is a plurality of the unsent mail messages associated with the received mail message, the unsent mail messages are preferentially read out in order of creation date and time or editing date and time of the unsent mail message, and the unsent mail message is displayed on the display part.

* * * * *